Aug. 5, 1958
J. H. BERTIN
2,845,774
GAS TURBINE OPERATIVELY ASSOCIATED WITH A PISTON
ENGINE-COMPRESSOR UNIT
Filed Feb. 15, 1955
3 Sheets-Sheet 1
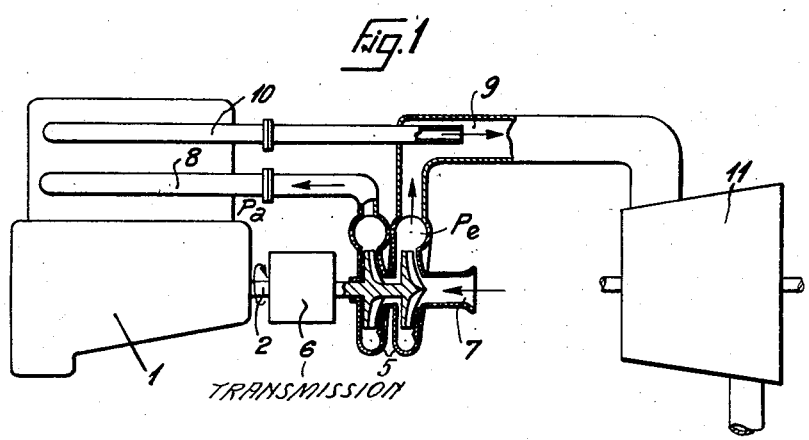
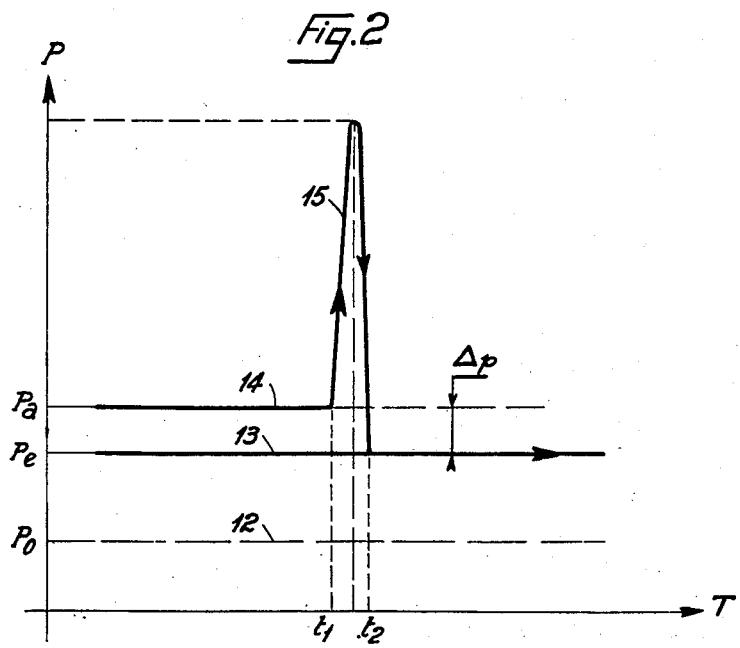
INVENTOR
Jean H. Bertin
By Watson, Cole, Grindle &
Watson ATTORNEYS

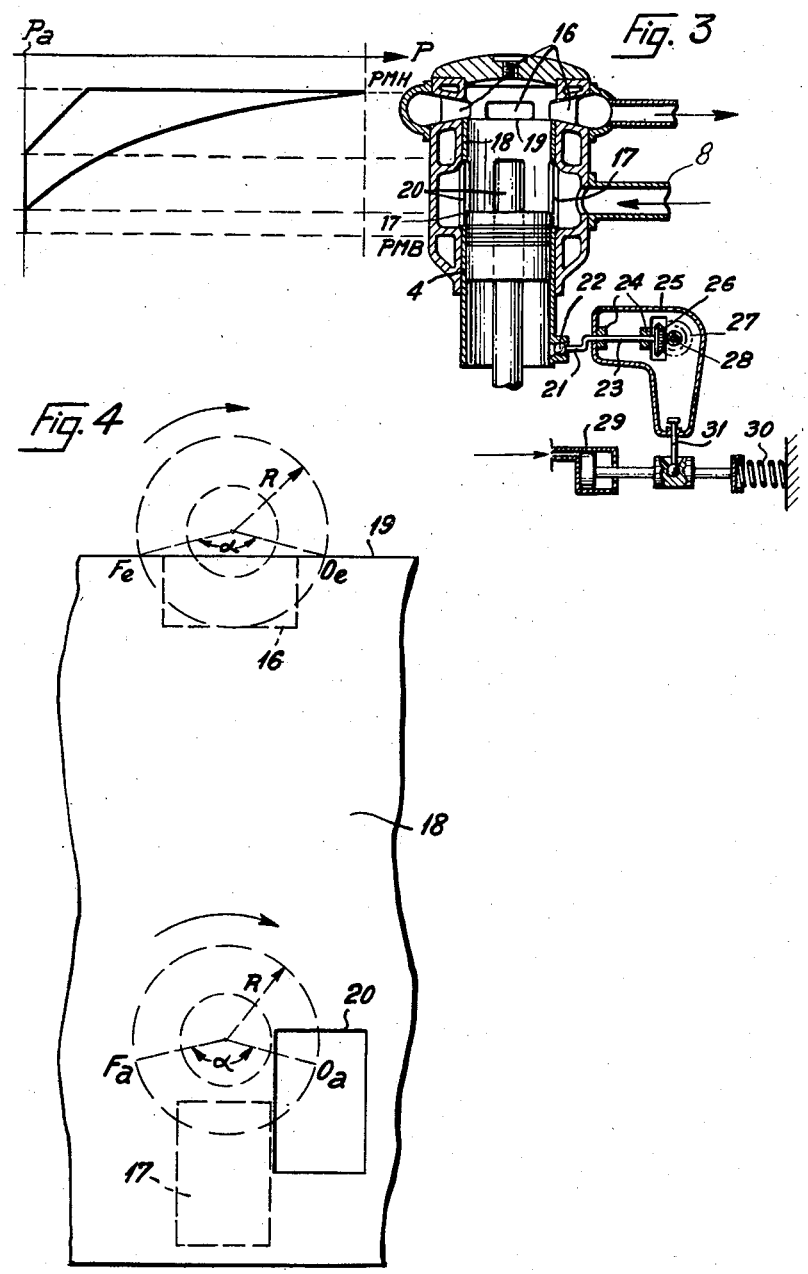

United States Patent Office 2,845,774
Patented Aug. 5, 1958

2,845,774

GAS TURBINE OPERATIVELY ASSOCIATED WITH A PISTON ENGINE-COMPRESSOR UNIT

Jean H. Bertin, Neuilly-sur-Seine, France, assignor to Societe Nationale d'Etude et de Construction de Moteurs d'Aviation, Paris, France, a French company Application February 15, 1955, Serial No. 488,365

Claims priority, application France February 26, 1954

2 Claims. (Cl. 60—13)

The production of high power outputs with piston engines sets a series of difficult technical problems. Thus, it has already been proposed to collect the power developed by piston engines, not in the form of mechanical energy but as compressed air, the latter being then employed in a suitable receiving device, for example a gas turbine. It is in this way that the Pateras PESCARA generators with free pistons were conceived, these having no crank-shaft.

On the other hand, it may be an advantage to effect this type of operation with piston engines having crank-shafts; these engines can indeed be employed also in the usual way, and the same type of engine may thus be suitable for the two categories of requirements, this leading to a reduction in the production cost by avoiding two very different methods of manufacture.

The present invention has for its object a power installation comprising a piston engine with a crank-shaft and an air compressor driven by the said shaft, the said compressor being adapted to supply, in addition to the output of air intended for supplying the cylinders of the engine, a further quantity of air which is in general greater than the first and which is mixed, without passing through the cylinder or cylinders of the engine, with the exhaust gases from these cylinders, the mixture of gas and air being utilized for driving a receiving machine such as a turbine.

The pressure of the air delivered by the compressor to the cylinders of the engine may be different from that of the air which is mixed directly with the exhaust gases. In the case of an engine having a scavenging cycle, the first pressure will generally be greater than the second so as to compensate for the loss of pressure incurred in passing through the cylinders. In the case of a motor without scavenging, the first pressure may also be equal to the second, but it may equally well be greater or less. In the case where different pressures are employed, the compressor will be provided with a number of stages or it may be subdivided into two separate bodies, in such manner that the deliveries of air at the two pressures may be derived from the compression apparatus. The compressor will preferably be adapted in such a way that the pressure of the output of air mixed with the exhaust gases will be approximately equal to that of the exhaust gases themselves.

This combination may be achieved in a number of different ways so as to give it the greatest number of advantages.

It is of special advantage, as will be shown later, to take for the piston engine a cycle similar to that which has been described in the U. S. Patent No. 2,670,593.

The description which follows below with respect to the attached drawings (which are given by way of example only and not in any sense by way of limitation) will make it quite clear how the invention may be carried into effect, the special features which are brought out, either in the drawings or in the text, being understood to form a part of the said invention.

Fig. 1 is a diagrammatic view of one form of embodiment of the invention.

Fig. 2 shows a diagram of the evolution of the pressures in the compressor and in one cylinder of the engine.

Fig. 3 shows a cross-section of a cylinder of the engine.

Fig. 4 illustrates the operation of the engine valve gear.

Figure 5:
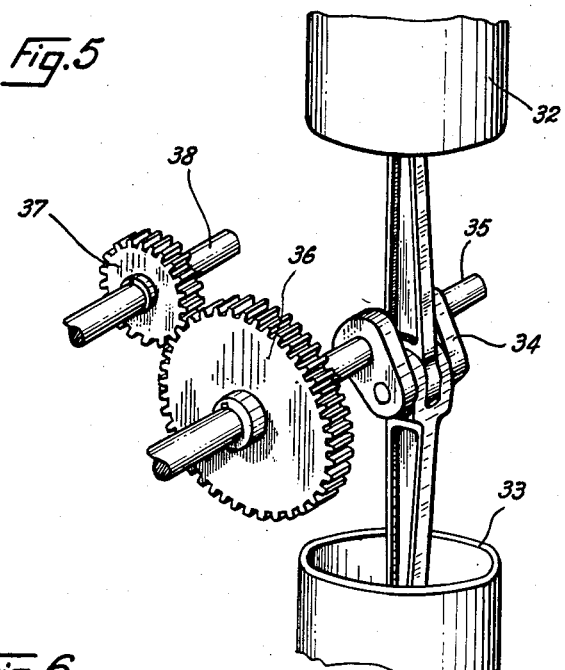
Fig. 5 shows a detail of an alternative form of embodiment of the engine.

In Fig. 1, the piston engine 1 is supposed to be of the two-stroke type. The crank-shaft 2 of the engine drives a compressor 5 which, in this example, is supposed to have two stages and to be of the centrifugal type, the drive being effected through the medium of a transmission arrangement 6, generally including a step-up gearing, intended to give the desired speed to the compressor. The latter sucks-in atmospheric air at 7. Its final stage delivers part of the air drawn-in to the admission pipe 8 of the cylinders of the engine at the pressure $Pa$ required for the admission. The first stage of the compressor delivers the greater part of the air drawn-in to a collector 9 which also receives the gases delivered from the exhaust pipe 10 of the engine at the pressure $Pe$, the delivery pressure of the first stage of the compressor being equal to $Pe$.

The collector 9 communicates with the admission side of a gas turbine 11 which is thus driven by the mixture of air and gas, at the pressure $Pe$ and at high temperature, coming from this collector. From the shaft of this turbine, there may be taken-off a useful power which is greater than that of the piston engine and this power may be used for driving a receiving machine of any kind.

The quantity of air delivered by the compressor into the collector 9 may, of course, be varied in such manner that the temperature of the mixture of air and gas admitted to the turbine is equal to the maximum admissible, account being taken of the resistance of the turbine blading. If the temperature is not sufficiently high, or in case of overload speeds, means may also be provided for heating the mixture before its entry to the turbine, by means of a combustion chamber for example, burning a suitable fuel in the air of the mixture. If this is necessary, a number of turbines may be placed in series or in parallel with intermediate heating stages in accordance with well known practice.

The diagram shown in Fig. 2 has been drawn with the times T as abscissae and the pressures P as ordinates. The horizontal line 12, 13, 14 have respectively as ordinates the atmospheric pressure $Po$, the pressure $Pe$ of the delivery of the first stage of the compressor, and the admission pressure $Pa$ of the engine. The curve 15 represents the variation of pressure which takes place between the time $t1$ and $t2$ in a cylinder of the engine by compression by the piston starting from $Pa$, combustion and expansion up to P. The scavenging of the engine is carried out at the difference $\Delta P$ between the pressures $Pa$ and $Pe$. This value $\Delta P$ depends on the resistance to flow or permeability of the valve gear and the cylinders to the flow of scavenging air. It may be small if the pipes and the admission and scavenging ports are adapted to reduce the losses in pressure. In the case of a four-stroke engine without scavenging, $Pa$ may be equal to $Pe$, the two outputs of air being respectively led towards the admission pipe 8 of the engine and to the collector 9, and are then taken from the same stage of the compressor. It is even possible to have an admission pressure $Pa$ less than the exhaust pressure $Pe$, the couplings of the pipe 8 and of the collector 9 to the stages of the compressor then being reversed in respect of their arrangements shown in Fig. 1.

The choice of the level of the pressure P$e$, which is the inlet pressure in the receiving turbine, with respect to the atmosphere, will depend in practice on the characteristics of the piston engine, of the receiving machine, and on the final temperatures admitted in the turbine, etc. In general, it will be found that $$1.5 < \frac{Pe}{Po} < 5$$

without this double condition being absolutely essential.

It is especially desirable to have the engine exhaust pressure as constant as possible, and it is for this reason that the piston engine can be caused to function in accordance with the special cycle which has been described in the U. S. Patent No. 2,670,593 referred to above.

This cycle is characterised by the following special features:

(a) In each cylinder of the engine, the admission and exhaust ports are opened at the same moment before the bottom dead center of the piston; and these ports are closed at the same moment before the top dead center.

(b) The admission pressure P$a$ is at least equal to the pressure obtaining in each cylinder at the moment at which the exhaust begins.

By this means, the pressure P$e$ remains constant in the exhaust pipe 10 during the whole period of exhaust and scavenging of a cylinder.

By choosing a sufficiently high value for the pressure P$a$, of the air delivered into the admission pipe 8, the compressor may be caused to carry out the greater part of the work of compressing the air before the ignition takes place in each cylinder, and the period of time covered by the exhaust and the scavenging may be prolonged, thus facilitating to the maximum extent the cooling of the engine cylinders by the scavenging air and the transfer of heat to the receiver turbine.

There has been shown in Fig. 3 an example of construction of a cylinder which enables this cycle to be followed. The cylinder comprises exhaust ports 16, bored in its upper part, and admission ports 17 having a certain height and extending from an intermediate point of the cylinder to the level reached by the upper edge of the piston at the bottom dead center. These ports are controlled by a sleeve 18 adapted to move in the cylinder. This sleeve covers and uncovers the exhaust ports 16 by its upper edge 19. It is, in addition, provided with ports 20 which may uncover the admission ports 17. The sleeve is preferably arranged to carry out simultaneously a to-and-fro oscillating movement along the axis of the cylinder and a reciprocating rotary movement about the said axis, and is actuated by a crank-arm 21 slidably mounted in a ball joint 22 arranged in a tenon of the sleeve. The shaft 23 of the crank-arm 21 rotates in bearings 24 provided in the support 25. The shaft 23 is coupled for rotation to the crank-shaft of the engine by means of the bevel gears 26, 27.

It will be seen that if the sleeve 18 is developed as in Fig. 4, and if R is the radius of the crank-arm 21, each of the points on the sleeve describes a circle of radius R during the course of one revolution of the crank-shaft. During this circular movement, the ports 20 and the upper edge 19 of the sleeve uncover the corresponding ports 17 and 16. O$a$, F$a$, O$e$ and F$e$ represent respectively the opening of the admission, the closure of the admission, and the opening and the closure of the exhaust. By a judicious arrangement of the ports, the times O$a$ and O$e$ may coincide, as may also the times F$a$ and F$e$. The angle $\alpha$ may, in addition be very great and may extend over a large portion of the cycle of each cylinder. Finally, by a suitable setting of the crank-arm 23 with respect to the crank-shaft of the engine, the times O$a$ and O$e$ may be suitably located with respect to the bottom dead center of the piston, as may also the times F$a$ and F$e$ with respect to the top dead center; these latter times may be situated closer to the top dead center than to the bottom dead center, as shown in the diagram of pressures drawn in respect of the cylinder shown in cross-section in Fig. 3.

There may also be added a device which enables the useful surfaces of the admission and exhaust ports to be simultaneously increased or reduced, depending on whether the load on the engine increases or decreases, as described in the U. S. patent application Ser. No. 239,688, filed August 1, 1951, now Patent No. 2,714,879, issued August 9, 1955.

Thus, the support 25 may be pivotally-mounted about the axis 28 of the pinion 27, so that it is possible to cause this support to rotate about the said axis 28, thus modifying the position of the trajectory described by each of the points of the sleeve 18. The pivotal movement of the support 25 may be controlled by an oil-pressure servo-motor 29 acting in opposition to a spring 30 on a crank-arm 31 coupled to the support 25.

The embodiments above described are, of course, only examples and may be modified to a large extent, since, for example, valves may be used instead of a moving sleeve to control the admission and exhaust ports, or again a mixed control combination of valves may be used for the ports 16 in the vicinity of the yoke of the cylinder, while the ports 17 formed close to the bottom of the cylinder may be controlled by a sleeve or by the piston itself.

In the embodiment shown in Fig. 5, two cylinders 32, 33, each equipped in the manner already described above are mounted in opposition so that the crank-rods of these cylinders act on the same crank-pin 34 of the crank-shaft 35. This crank-shaft carries a pinion 36 which engages with a toothed wheel 37 on a power take-off shaft 38 which is coupled to the air compressor. A number of units, each comprising two opposed cylinders, may be combined with each other in such a manner that the pinions 36 of these units mesh with the same toothed wheel 37 or a number of these wheels mounted on the shaft 38.

The desired power output may of course be obtained by constructing the engine with a suitable number of cylinders, but it will be more advantageous to construct an engine of low power, the manufacture of which can be standardized, and then to group these engines in numbers depending on the total power output required.

Figure 6:
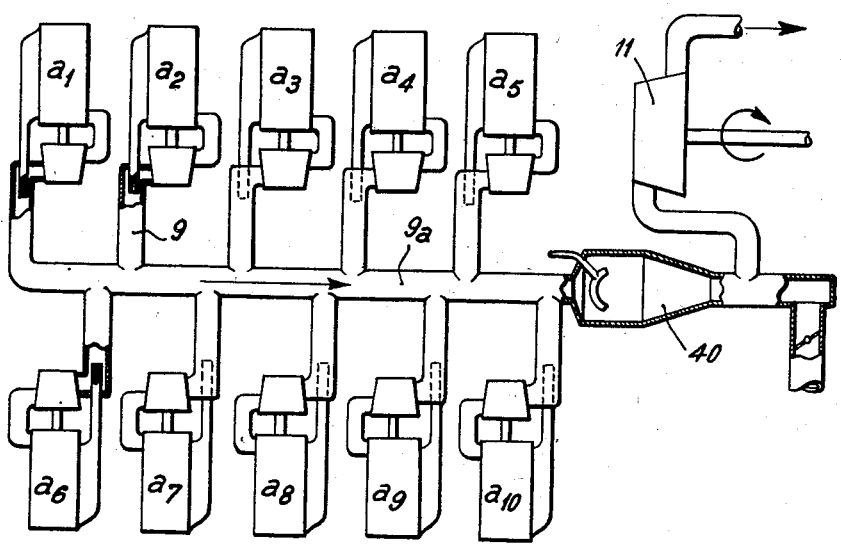
Fig. 6 shows the general arrangement of an installation comprising several engine-compressor sets.

Fig. 6 shows an example of this kind in which the collectors 9 of ten engines $a_1$, $a_2$, $a_3$ . . . $a_{10}$ deliver into a common collector 9$a$ which supplies the turbine or the group of turbines 11. Fig. 6 also shows a combustion chamber 40 arranged on the upstream side of the turbine so as to provide a superheating of the mixture delivered to the latter, the said superheat being capable of regulation in dependence on the value of the load required from the turbine.

It will, of course be understood that modifications may be made to the forms of embodiment which have just been described, in particular by the substitution of equivalent technical means, without thereby departing from the spirit or from the scope of the present invention.

What I claim is:

1. A power plant comprising an internal combustion piston engine having air intake ports and gas exhaust ports, a multi-stage air compressor driven by the said piston engine and having a high pressure delivery end and a low pressure delivery end, piping means between the said high pressure delivery end and the said intake ports whereby high pressure air is supplied to the said engine to effect scavenging and charging thereof, a gas turbine having an inlet, piping means between the said exhaust ports and the said inlet, and a by-pass duct between the said low pressure delivery end and a point of the last-mentioned piping means upstream of the said inlet, whereby the gas turbine is fed with motive gas consisting of a mixture of the combustion gases issuing from the piston engine and low pressure air delivered by the multi-stage compressor.

2. Power plant as claimed in claim 1, wherein the air compressor is so designed that the air flow delivered at the low pressure delivery end for mixing purposes is greater than the air flow delivered at the high pressure delivery end for scavenging purposes.

References Cited in the file of this patent

UNITED STATES PATENTS

| | | |
|---|---|---|
| 1,741,730 | Newton | Dec. 31, 1929 |
| 1,783,018 | Johansson | Nov. 25, 1930 |
| 1,837,620 | Karl | Dec. 22, 1931 |
| 1,856,024 | Buchi | Apr. 26, 1932 |
| 2,189,106 | Garve et al. | Feb. 6, 1940 |
| 2,585,968 | Schneider | Feb. 19, 1952 |
| 2,670,594 | Crooks | Mar. 2, 1954 |
| 2,714,879 | Meulien et al. | Aug. 9, 1955 |